W. Murdock,
Casting Ordnance.
N° 35,248.    Patented May 13, 1862.

Witnesses:
J. B. Roman
Chas. H. Evans

Inventor:
William Murdock

UNITED STATES PATENT OFFICE.

WILLIAM MURDOCK, OF JERSEY CITY, NEW JERSEY.

IMPROVEMENT IN MOLDS FOR CASTINGS.

Specification forming part of Letters Patent No. 35,248, dated May 13, 1862.

*To all whom it may concern:*

Be it known that I, WILLIAM MURDOCK, of Jersey City, in the county of Hudson, State of New Jersey, have invented a new and Improved Mode of Making Castings in Iron, such as cannon-balls, shell, dumb-bells, clock, scale, and sash-weights, &c.; and I do hereby declare that the following is a full and exact description thereof, reference being had to the accompanying drawings, and to the letters of reference marked thereon.

Figure 2:
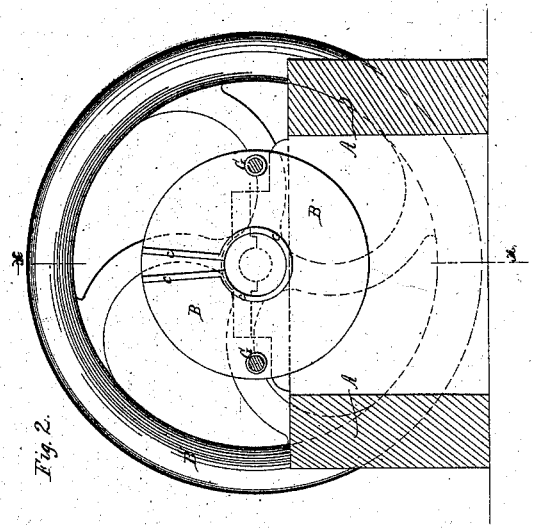
Figure 1:
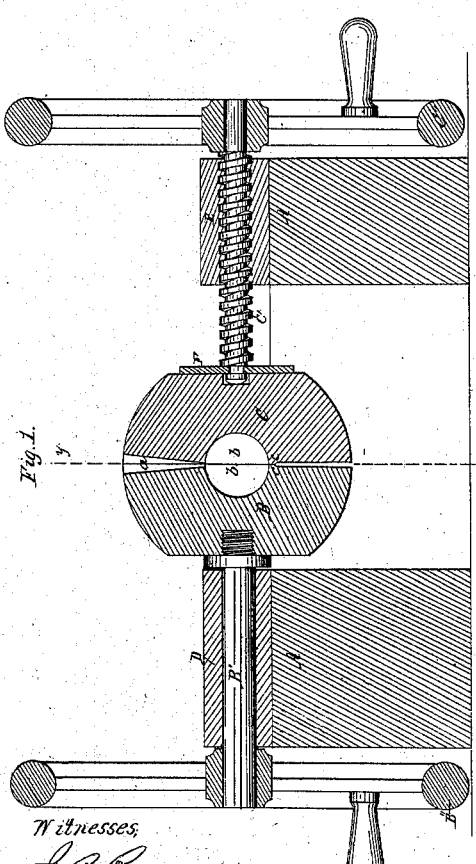
Figure 3:
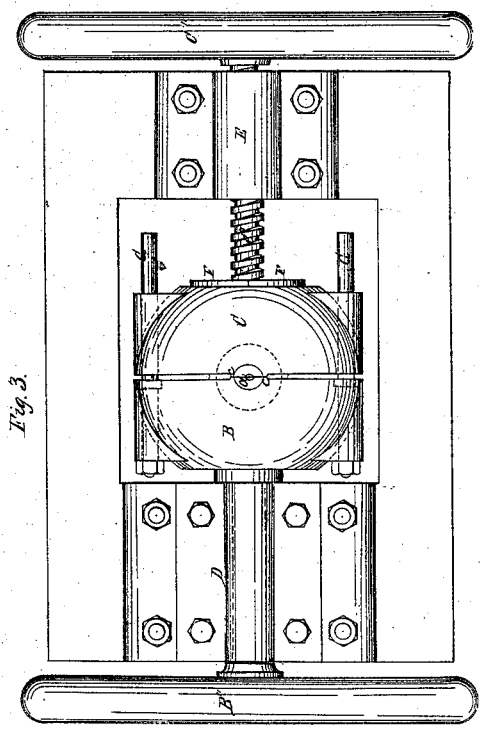

In these drawings, Figure 1 represents a section in line X X of Fig. 2. Fig. 2 represents a section in line Y Y of Fig. 1. Fig. 3 represents a plan view.

Letter A represents the frame of the mold. Letter B represents the mold to which the shaft is attached; letter C, the mold which is driven by the screw; B', the shaft; B'', the balance-wheel; C', the screw; C'', the screw-wheel; $a$, the gate of the mold; $b$, space inside of mold or form of casting; $c$, raised edges; D, shaft-boxes; E, stationary nut of screw; F, caps with end of screw in position; G, pins and corresponding holes.

The nature of my invention consists in an improved cast-iron mold in two parts, the inside of which is a space, $b$, of the size and form of the casting to be made, with a gate, $a$, for the metal cut from the outside to the space $b$ of the molds, one-half in each mold around this gate $a$ and the form of the casting or space $b$, and on each mold a raised edge, $c$, is to be made of one-quarter of an inch in width and one-sixteenth of an inch in thickness, (more or less.) Said edges $c$ must be fitted closely together mold to mold. The object of this raised edge $c$ is to prevent the molds, when hot and expanded, from opening next to the form of casting or space $b$, and this overcomes perhaps the greatest objection to the use of cast-iron molds. (Ordinarily, molds are faced together entirely across their meeting surface, and, of necessity, being very thick, their inner edges being in contact with the molten metal, heat and expand one from the other, while their outside edges, being removed from the direct cause of heat, and being exposed to the air, remain comparatively cool and still closed, thus causing a serious imperfection in every casting made after the first.)

My molds are hung horizontally in an iron frame, A, of sufficient length as to allow one mold C to be drawn away from the other mold B, till the casting drops. On the outer edge of the face of one mold B are two or more pins, G, with corresponding holes G in the other mold C, and on the outside of the pin-mold B, opposite the form of casting $b$, is a shaft, B', passing through a set of boxes, D, on the frame A. Upon the extreme end of this shaft B' is hung a balance-wheel, B'', of sufficient weight to balance the molds. On the outside of the other mold C, corresponding to where the shaft B' is on the opposite mold B, is a hole or countersink. Into this hole is admitted the end of a screw, C', with a collar one-half of an inch from the point. When the point of the screw C' is in its position a cap, F, in halves with a half-hole in each, these holes are placed around the collar of the screw C' and the caps F screwed to the mold C, thus preventing the withdrawal of the screw C' from the mold C. On this end of the frame A, corresponding with the shaft-boxes D on the opposite end, is a stationary nut of screw E, and on the outer end of this screw C' is a fly-wheel, C'', for driving it. The agency of this screw C' is manifold. It closes and opens the molds with ease and rapidity, and holds them firmly together while pouring the metal. It allows the molds to be worked at great heat, for by it the party working is subject to no inconvenient heat. It discharges the castings with dispatch, thus relieving the molds and improving the nature of the casting made. By its agency the molds can be poured continually without fear of melting or becoming too hot to work conveniently.

The mode of casting is—viz., the molds being screwed together with the gate $a$ uppermost, into them the metal poured, the wheel B'' on the shaft B' revolved slowly and regularly while the metal is in a molten state, (the neck or smallest part of the gate $a$ chills instantly, preventing the metal from running from the molds while revolving,) and until the outside of the casting is set, thus throwing the heaviest and solid parts of the metal to the surface, and all dross, dirt, shrinkage, &c., to the inside of the casting. When the outside of the casting has become firm or set, the screw C' is run back and the casting dropped as soon as possible, so as to prevent the molds from becoming unnecessarily hot, and allowing the casting to cool from a white heat in the air. By so doing the castings become perfectly soft when cool.

In the making of shell, a core-tube print must be cut between the molds, half in each, and opposite the gate $a$, and the core-tube fitted nicely into it. When the molds are screwed together, the core will be held in a very correct and firm position. In castings that require it screws, wires, chills, cores of various kinds, &c., can be set in like manner.

Having now fully described my invention, what I claim therein as new, and desire to secure by Letters Patent of the United States, is—

1. The screw $C'$, in combination with the movable section or half-mold C, and the pins and holes G, as and for the purpose specified.

2. The arrangement of the elevated or raised edges $e$ around the form of casting $b$, and gate $a$ upon the metallic molds, as and for the purpose set forth in specification.

WILLIAM MURDOCK.

Witnesses:
 J. B. ROMAR,
 CHAS. W. EVANS.